United States Patent
Bayerl

(10) Patent No.: US 6,273,062 B1
(45) Date of Patent: Aug. 14, 2001

(54) METHOD AND APPARATUS FOR COMPENSATING THE INFLUENCE OF DIFFERENT AIR CAPACITIES OF ENGINE CYLINDERS

(75) Inventor: Herbert Bayerl, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/412,316

(22) Filed: Oct. 5, 1999

(30) Foreign Application Priority Data

Oct. 5, 1998 (DE) .............................. 198 45 749

(51) Int. Cl.⁷ .................................................. F02D 41/14
(52) U.S. Cl. ........................................... 123/336; 123/436
(58) Field of Search ............................... 123/336, 339.23, 123/406.2, 406.23, 436, 673; 73/118.2; 701/110

(56) References Cited

U.S. PATENT DOCUMENTS

| | | | |
|---|---|---|---|
| 4,418,669 | * 12/1983 | Johnson et al. | 123/436 |
| 4,475,511 | * 10/1984 | Johnson et al. | 123/436 |
| 4,476,833 | * 10/1984 | Johnson et al. | 123/436 |
| 4,495,920 | * 1/1985 | Matsumura et al. | 123/436 |
| 4,535,406 | * 8/1985 | Johnson | 123/436 X |
| 4,667,634 | * 5/1987 | Matsumura et al. | 123/436 X |
| 5,146,888 | * 9/1992 | Sawamoto | 123/339.23 X |
| 5,515,828 | * 5/1996 | Cook et al. | 123/436 |
| 5,775,299 | * 7/1998 | Ito et al. | 123/436 |
| 5,893,042 | 4/1999 | Lohman et al. | 701/111 |

FOREIGN PATENT DOCUMENTS

| | | |
|---|---|---|
| 238189 | 4/1984 | (DE) . |
| 4131978 | 4/1992 | (DE) . |
| 19580490 | 6/1996 | (DE) . |
| 19633066 | 4/1998 | (DE) . |
| 0651149 | 5/1995 | (EP) . |
| 0758049 | 2/1997 | (EP) . |
| 0825336 | 2/1998 | (EP) . |

OTHER PUBLICATIONS

Patent Abstracts of Japan, Jul. 22, 1997. No. 09189252A.

* cited by examiner

*Primary Examiner*—Tony M. Argenbright
(74) *Attorney, Agent, or Firm*—Crowell & Moring, L.L.P.

(57) ABSTRACT

In a method and apparatus for compensating the influence of different air capacities in an internal combustion engine at idle with a plurality of cylinder-individual air control devices, the segment times of the cylinders of the engine are determined and at least the segment time of the cylinder that shows the greatest deviation from the average segment time of the cylinders is adjusted to reduce the deviation by changing the injection volume.

14 Claims, 1 Drawing Sheet

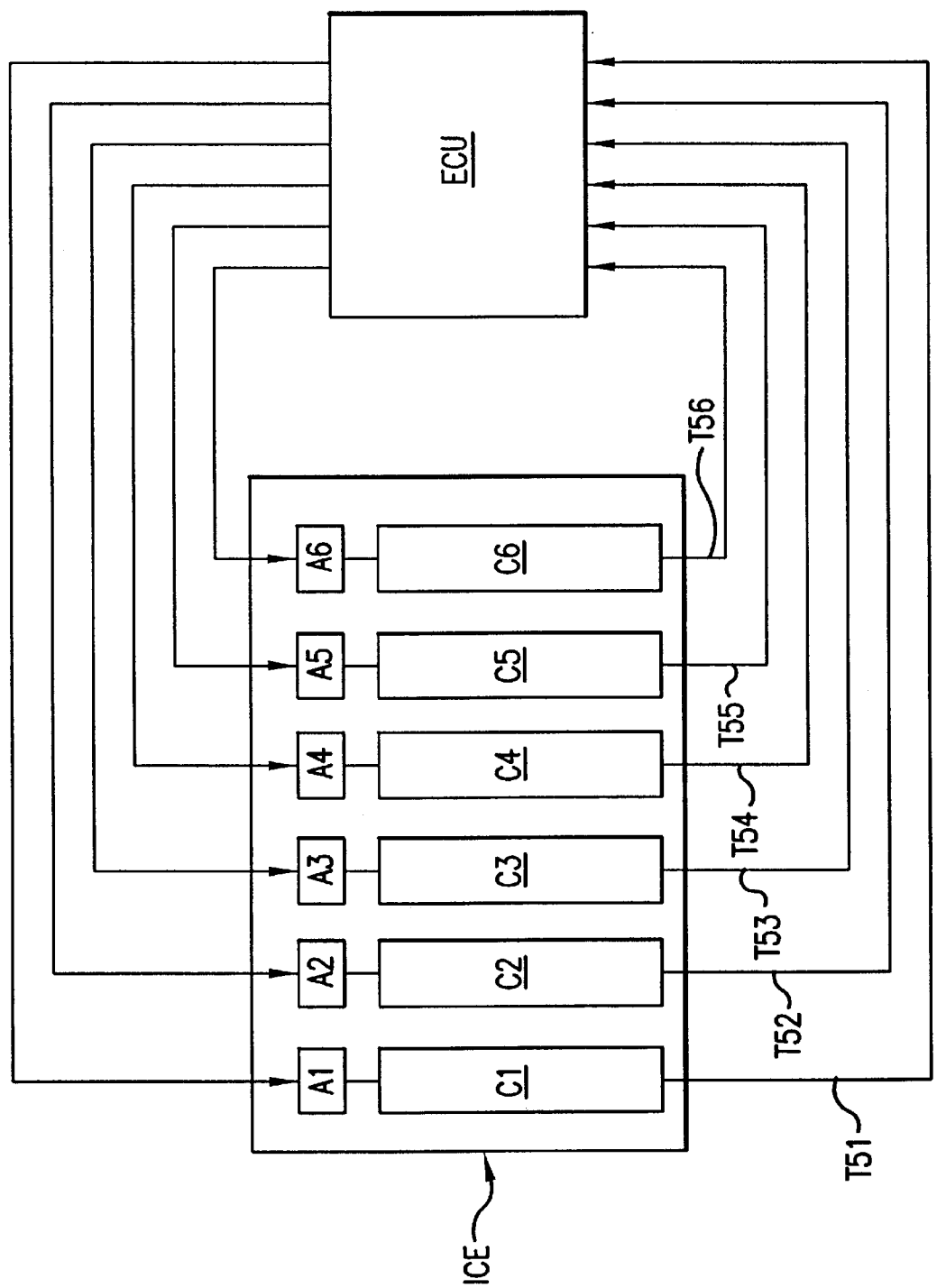

METHOD AND APPARATUS FOR COMPENSATING THE INFLUENCE OF DIFFERENT AIR CAPACITIES OF ENGINE CYLINDERS

BACKGROUND AND SUMMARY OF THE INVENTION

This application claims the priority of German application 198 45 749.9, filed in Germany on Oct. 5, 1998, the disclosure of which is expressly incorporated by reference herein.

The invention relates to a method and system for compensating the influence of different air capacities in an engine at idle with a plurality of cylinder-individual air control devices.

The term "cylinder-individual air control devices" in the application covers individual throttles and/or cylinder-individual air intake valves.

It is conventional to correct the differences in air capacities of individual cylinders of such an internal combustion engine caused by assembly and manufacturing tolerances as well as aging factors, on one occasion before (re-) starting, for example at the factory or in a garage. In this process, for example, the idle settings of the cylinder-individual air control devices designed as individual throttle valves are corrected by changing the idle stop. These methods are tedious and do not take into account changes that occur during operation, for example as a result of increasing contamination of the cylinder-individual air control devices.

A goal of the invention is to provide a method of the species recited at the outset in which manual intervention of whatever kind for compensating the influence of different air capacities is eliminated.

The invention achieves this goal by providing an arrangement, wherein a segment time of a cylinder with a greatest deviation from an average segment time of the cylinders is adjusted by a change in its injection volume which results in a reduction of said deviation.

By means of the invention, mechanical tolerance is not corrected by mechanical intervention but by a change in the injected volume of least one cylinder. Following a determination of the segment time of the cylinders, the cylinder with the maximum deviation in segment time is preferably adjusted by changing the injection volume. The goal is to adjust the segment time of the cylinder to that of the other cylinders.

This adjustment takes place once during an operating phase of the engine, at the beginning of this phase or at regular time intervals, days for example. The result of this adjustment is stored permanently. Each time the engine is in the idle state, the injection volume of the cylinders affected by the correction measure according to the invention is changed accordingly relative to the original state with an injection volume that is the same for all cylinders.

The determination of the segment time is known as such for determining the rotational speed, crankshaft, and camshaft positions of an engine. It is preferably used in detecting misfires. For example, see U.S. Pat. No. 5,893,042, corresponding to German DOS DE 195 35 094 A1 for an exemplary segment time determination method and system. It is novel within the framework of the present invention to obtain an idea of the air capacities of the cylinders through a measurement of the segment times and to follow the effects of the injection volume corrections based on the changes in segment times of the cylinders.

Since any change to the injected volume is linked to a change in the mixture composition and hence to the exhaust emission specifications, the method according to the invention can be improved by linking the change in the injection volume of a cylinder with a corresponding opposite change in the injection volumes of the other cylinders. As a result, the necessary exhaust emission specifications can be maintained despite the improvement in the smoothness of the operation of the engine.

Since in the method according to the invention it is preferably the cylinder with the smallest segment time difference that is to be matched, the cylinder with the shortest or the cylinder with the longest segment time can be selected. It is advantageous in this connection to select the cylinder with the longest segment time corresponding to the "slowest" cylinder. The additional amount of fuel supplied to this cylinder, under the condition of constant exhaust emission specifications, can be corrected by a corresponding reduction in the injection volume of at least one other cylinder in a manner that is simple from the standpoint of regulation technology. The injection volume is reduced in the cylinder that has the shortest segment time, in other words the "fastest" cylinder.

The method according to the invention is not limited to the cylinder that deviates the most from the average in its segment time. Instead, all of the cylinders which for example lie outside the specified tolerance range can have their segment times adjusted so that they fall within the tolerance range. Accordingly, the change in injection volume made for this segment time adjustment is corrected by a corresponding opposite change in the injection volume (of one) of the other cylinders.

As a rule, it is not sufficient to correct the injection volumes of one cylinder only once. Instead, a regulation process is involved which takes the form of several successive steps and in which one or more cylinders have their injection volumes increased sequentially or simultaneously while at the same time other or the other cylinders have their injection volumes reduced. The goal here is to reduce uneven running as much as possible by changing injection volumes while at the same time not changing the exhaust emission specifications over all cylinders. In an engine in which the cylinders are arranged in banks and controlled and/or regulated in the same way, it may be advantageous to perform the compensation according to the invention in a bank-selective manner, in other words individually for each bank of cylinders. In this way, the cost of regulation can be reduced sharply.

The result of the method according to the invention is an engine with a high degree of quiet running but with air capacities that are still different for the individual cylinders.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic depiction of a multicylinder engine with a control system constructed according to preferred embodiments of the present invention.

DETAILED DESCRIPTION OF THE DRAWINGS

The single drawing FIGURE schematically depicts an internal combustion engine ICE having six cylinders C1, C2, C3, C4, C5 and C6. A separately controllable cylinder-individual air control device A1, A2, A3, A4, A5 and A6 is provided for each of the respective cylinders.

A time segment detection system is provide for detecting the individual cylinder time segments and generating corresponding time signals TS1, TS2, TS3, TS4, TS5 and TS6 which are fed to an electronic control unit ECU. The electronic control unit ECU processes the signals to determine an average segment time as well as deviations of respective individual segment times from the average segment time. The ECU then operates to control the respective air control devices at the individual cylinders as a function of the deviations from the average segment time. The various control arrangements implemented by the ECU and schematically depicted control devices are described above and in the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of operating an internal combustion engine having a plurality of cylinders and respective separate air control devices for each cylinder, said method comprising operating said engine while:

detecting segment times of respective ones of the individual cylinders and generating segment time signals for each cylinder representing air capacities for the respective cylinder, processing said segment time signals to determine which cylinder has a segment time with a greatest deviation from an average segment time for all of said cylinders, and adjusting a respective air control device at said cylinder with a greatest deviation to change the time segment of said cylinder in a direction to reduce said deviation.

2. Method according to claim 1, comprising adjusting respective air control devices at other of said cylinders in a direction opposite adjustment of the air control device at said cylinder with a greatest deviation.

3. Method according to claim 2, comprising controlling fuel volume to the cylinders, including supplying correspondingly larger volumes of fuel to cylinders with the longest segment times.

4. Method according to claim 2, wherein said adjusting is performed in a bank-selected manner in an engine with a plurality of cylinder banks.

5. Method according to claim 1, comprising controlling fuel volume to the cylinders, including supplying correspondingly larger volumes of fuel to cylinders with the longest segment times.

6. Method according to claim 5, wherein said adjusting is performed in a bank-selected manner in an engine with a plurality of cylinder banks.

7. Method according to claim 1, wherein said adjusting is performed in a bank-selected manner in an engine with a plurality of cylinder banks.

8. An internal combustion engine comprising:

a plurality of cylinders, respective separately controllable air control devices at each cylinder, segment time detecting means for detecting segment times of respective ones of the individual cylinders and generating segment time signals for each cylinder representing air capacities for the respective cylinder, processing means for processing said segment time signals to determine which cylinder has a segment time with a greatest deviation from an average segment time for all of said cylinders, and adjusting means for adjusting a respective air control device at said cylinder with a greatest deviation to change the time segment of said cylinder in a direction to reduce said deviation.

9. An internal combustion engine according to claim 8, wherein said adjusting means includes means for adjusting respective air control devices at other of said cylinders in a direction opposite adjustment of the air control device at said cylinder with a greatest deviation.

10. An internal combustion engine according to claim 9, comprising fuel volume control means for supplying larger volumes of fuel to cylinders with the largest segment times.

11. An internal combustion engine according to claim 9, wherein said adjusting means are operable to perform said adjusting in a bank selective manner in an engine with a plurality of cylinder banks.

12. An internal combustion engine according to claim 8, comprising fuel volume control means for supplying larger volumes of fuel to cylinders with the largest segment times.

13. An internal combustion engine according to claim 12, wherein said adjusting means are operable to perform said adjusting in a bank selective manner in an engine with a plurality of cylinder banks.

14. An internal combustion engine according to claim 8, wherein said adjusting means are operable to perform said adjusting in a bank selective manner in an engine with a plurality of cylinder banks.

* * * * *